V. C. DOERSCHUK
May 5, 1931. CARBON ELECTRODE AND METHOD OF MOLDING THE SAME Re. 18,062
Original Filed July 19, 1927
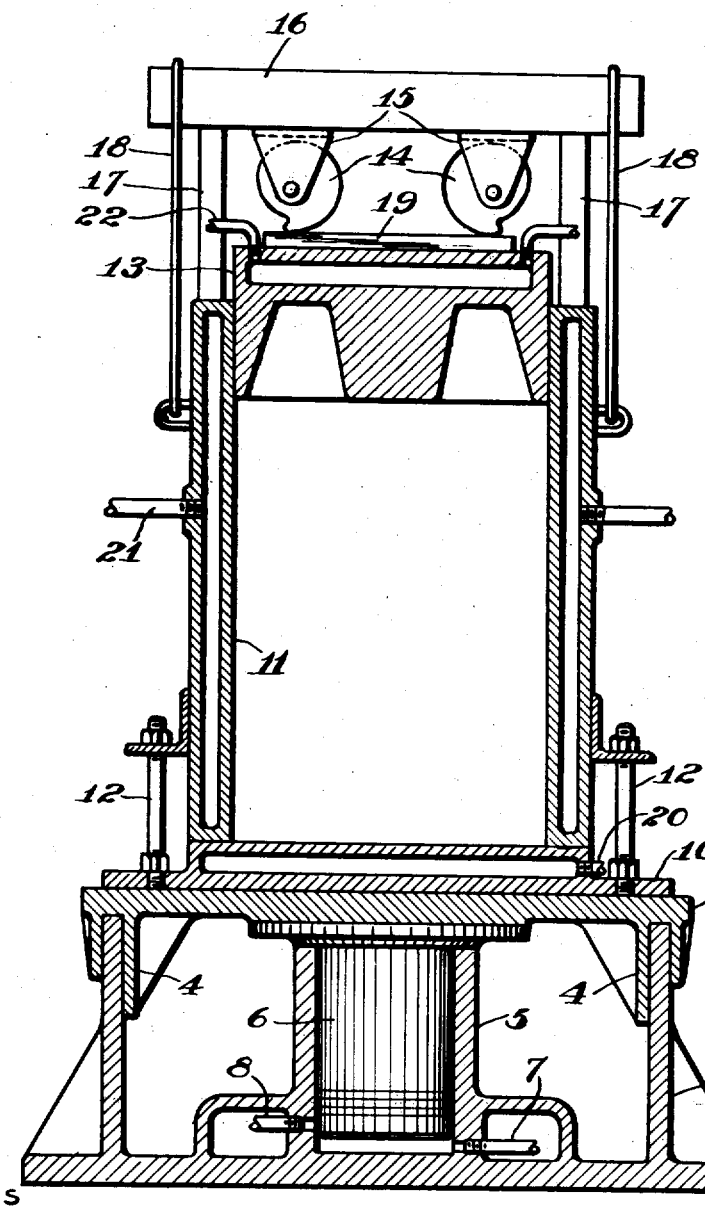
WITNESS
A. B. Wallace.
INVENTOR
Victor C. Doerschuk,
by Brown & Critchlow
his attorneys.

Reissued May 5, 1931 Re. 18,062

UNITED STATES PATENT OFFICE

VICTOR C. DOERSCHUK, OF MASSENA, NEW YORK, ASSIGNOR TO ALUMINUM COMPANY OF AMERICA, OF PITTSBURGH, PENNSYLVANIA, A CORPORATION OF PENNSYLVANIA

CARBON ELECTRODE AND METHOD OF MOLDING THE SAME

Original No. 1,683,587, dated September 4, 1928, Serial No. 206,922, filed July 19, 1927. Application for reissue filed August 27, 1930. Serial No. 478,259.

The invention relates to the molding of mixtures of granular materials, such as coke and silicon carbide, and plastic binders of relative viscous bitumens such as pitch and tar, the binder being added to and mixed with the granular materials to render them coherent when molded. While in its broader aspects the invention is unlimited to any specific article or class of articles, it is particularly applicable to the manufacture of carbon electrodes such as are used in electric furnaces for metallurgical and like operations.

In the manufacture of such electrodes, ground coke, or other suitable granular carbonaceous material, is mixed with tar or pitch, or with a mixture of tar and pitch, to form a mass which is then molded into desired form by tamping or pressing it in a mold, or by extruding it under high pressure through a die. Thereafter the molded article is fired or baked at a temperature of about 1000° C. to harden it and to remove the volatile constituents of the binder. By reason of its bituminous binder, the mixture just explained is stiff, unconsolidated, contains voids or air pockets, and tends to ball up when handled and because of these physical characteristics it is difficult in the prevailing tamping and extrusion molding processes to secure the desired degree of density and freedom from interior defects, particularly in larger articles such as electrodes of twenty inches or more in diameter. Also, when electrodes are molded by the extrusion process, cores are formed because the mixture does not flow equally throughout the cross section of the die.

The object of this invention is to provide a method of molding mixtures of granular materials and viscous bitumens whereby articles having uniform increased density may be economically formed.

The invention is predicated upon by discovery that a granular material mixed with a bituminous plastic binder to form a normally non-coherent and unconsolidated mass, may be readily molded into a compact coherent mass of substantially uniform increased density throughout, and substantially free from internal defects, by confining the mixture in a mold and subjecting the mold and its contents to a repeated jarring action.

In forming carbon electrodes of the type to which reference has been made, the general practice is to prepare a mixture containing from about 70 to 88% of crushed or ground carbon, such as anthracite, petroleum coke, and electrode scrap or graphite which has been calcined to uniformly and thoroughly remove its volatile constituents, and from about 12 to 30% tar and pitch. The relative proportions of the tar and pitch vary for different service requirements of the electrodes, and with respect to the different conditions of the mix itself. In fact, due to variations in these and other factors, the mixes may contain from 50 to 95% of ground carbonaceous material and from 50 to 5% of binder. These materials are thoroughly mixed in a suitable mixer, and the mixture, because of its bituminous binder, has the physical characteristics previously explained.

According to the present invention, an unconsolidated mix, which may be the same as heretofore used, is placed in a suitable vertical mold adapted to be supported by, or forming a part of, a jolting machine of any suitable or desired construction. Prior to being placed in a mold, the mix is preferably heated to a temperature of about 100° C. or higher, depending of course on the character of the binder and to prevent the chilling of the mix by its contact with the walls of the mold, the mold is preferably heated prior to the introduction of the mix. This mix may be shoveled into the mold, or conveyed to it by a continuous belt or other type of conveyor. While it is being filled with the mix the mold is preferably jolted and, when supplied with the required amount of the mix, a heated weight is placed upon its upper surface to confine it and to exert pressure upon it while the jolting operation is continued in a vertical direction for a sufficient period of time to thoroughly compact and densify the mix. In place of a weight, other instrumentalities may be used to confine the upper portion of the mix in a mold during the jarring operation.

At the end of the jarring operation it has been found to be advantageous to cool the mold and the surface of the molded article before removing the molded article from it.

Various forms of jolting machines of the type contemplated are well known, and commonly used in the forming of sand molds in foundries for casting metals, and for other purposes. By way of illustration and not of limitation, there is somewhat diagrammatically shown in the accompanying drawing a vertical central sectional view of a form of pneumatic jolting machine which may be used, and supported on such machine there is shown a vertical central sectional view of a mold for forming a carbon electrode.

The jarring machine comprises a base 1 having sides 2 and a table 3 provided with downwardly extending guides 4 which telescopically receive the upper end of sides 2. The base is provided centrally with a cylinder 5 which receives a piston 6 attached to table 3. For raising the table, pressure fluid may be supplied to cylinder 5 through a pipe 7, and to permit the table to fall the pressure fluid may be exhausted from the cylinder through a pipe 8. In dropping, the table falls onto the top of the sides 2 of the base, these sides forming an anvil for stopping the downward travel of the table. By this means a considerable jolt is imparted to the mold and its contents at the end of the downward movement of the mold.

The mold resting upon table 3 comprises a base 10 and a vertical side wall 11 which may be attached to the base by bolts 12, as shown. A weight 13 is arranged in the upper portion of the mold to confine the upper end of an electrode mixture during the jarring operation. To hold the weight against displacement, a pair of gravity cams 14 pivotally mounted eccentrically in brackets 15 attached to the lower end of a bar 16 extending transversely of the mold, the bar being supported by posts 17, and tied to the mold by links 18. Between cams 14 and the top of weight 13 there is a filler 19 of variable thickness. As material in the mold becomes compacted in a jarring operation, gravity cams 14 gradually wedge themselves between bars 16 and a filler 19 to hold weight 13 firmly against the top of the material. The weight 19 constitutes a follower at the top of the mold while the cams 14 function to maintain the follower continuously in contact with the material. When the downward movement of the mold is suddenly stopped the inertia of the mass of material within the mold tends to carry it down so that the moment of greatest compression of the material occurs at this time. Due to the fact that the cams are off-center, the same inertia effect will tend to rotate them so that the cams will be most strongly urged toward the follower plate at the moment of greatest compression of the material. Since the follower itself is also carried down by this inertia effect this movement of the cams encounters the least resistance at this time.

As shown, mold base 10, vertical wall 11, and weight 13 may be of double-wall construction for heating these parts before a molding operation, steam or other heated fluid being supplied to those parts through pipes 20, 21 and 22. At the end of the molding operation, a cooling fluid may be introduced into these mold parts to facilitate the removal of a molded electrode. By the provision of fluid circulating passages entirely around the mold, as well as at the top and bottom thereof, it is possible to preheat the mold so that upon the introduction of the mix, the mix is prevented from cooling to a point where it will no longer respond to the jarring of the mold. The provision of means for heating the top and bottom surfaces of the electrode is particularly desirable in securing a uniform texture near the ends of the electrode. The jacketing of the mold also allows for the rapid cooling of the molded electrode by providing a passage through which a cooling fluid can be circulated after the compacting operation has been completed.

By way of example, I have found that in the manufacture of carbon electrode a mixture formed of about 35% coarse petroleum coke, 43% fine petroleum coke, 10% ground butts of electrodes, 9% pitch and 3% tar, when placed in a mold for forming an electrode having a cross section 12″ x 16″, may be thoroughly compacted to form a coherent and uniformly dense molded mass by jarring the mold for five minutes on a heavy duty jolting machine, using a weight of about two thousand pounds upon the top of the mix after the mold has been supplied with the required amount of it.

As an example of the applicability of the invention to the economical production of much larger electrodes, a mixture composed of about 40% baked electrode scrap ground to pass a one inch mesh screen, about 30% calcined anthracite coal flour ground so that 60% of it passed through a 200 mesh screen and approximately 30% pitch as a binder was gradually fed into an octagonal mold supported on a jolting machine which was operated at the rate of sixty drops per minute while the mix was being added. The greatest sectional dimensions of this mold were 26 and 44 inches. The mix, at a temperature of about 150° C. was continuously added at the rate of several hundred pounds per minute, the mold being previously heated to about 165° C. After the mold was supplied with the required amount of mix, a weight of about six thousand pounds was placed on top of the mix and the machine run for three minutes. This electrode was 139 inches long, weighed 8240 pounds, and the total time required to make it was 29 minutes.

By jarring the mold during the time the mix is being introduced, a large part of the compacting of the material occurs while the mold is being filled, so that the length of the mold does not have to be excessively greater than the length of the completed electrode. Moreover, this step in the operation allows for the adjustment of the particles in the mix at a time when they are under less pressure.

Carbon linings of furnaces used in metallurgical operations, such as those used in the production of aluminum by the well known Hall process, may be molded in place in a similar manner. In making such linings the mixture may be about 86% of metallurgical bituminous coal coke and about 14% tar and pitch, although other proportions and mixes may be used. The mixture is placed in the furnace shell itself, a form and weight is placed on top of the mixture, and the entire furnace shell, lining forming mixture, form, and weight then jolted until the mixture is properly compacted.

In the manufacture of articles of the type herein contemplated, the green molded mixtures are baked to harden them and to remove the volatile constituents of the binder, its non-volatile constituents remaining in the article as coke or graphite, depending on the temperature of baking. In electrodes and furnace linings it is particularly desirable that they be as free as possible of voids. By the practice of this invention this desideratum is readily attained, particularly in the case of very large articles, which, prior to this invention, have been largely made by hand and therefore less uniformly dense.

An important advantage incident to the manufacture of electrodes according to this invention has to do with the prevailing position in which irregularly shaped particles of a mix lie by reason of the jolting operation. In the extrusion process of molding electrodes the tendency is for the larger dimensions of non-uniform particles of carbon to lie in the direction of the extrusion, and in the tamping process there is little if any tendency towards any definite orientation of the particles. In the practice of this invention, the introduction of the material into the mold and the subsequent jolting thereof is carried on under conditions inducive of and for the purpose of not only compacting the mass, but causing the majority of such particles as have at least one dimension greater than another to so orient themselves that they lie with their greatest cross-sectional area in a direction at right angles to the jolting, or in other words, with the longest axis at right angles to the longitudinal axis of the finished electrode. The particles therefore lie in a direction to increase the radial heat conductivity of the electrode and the resistance to heat conductivity axially of the electrode. The resistance to heat conductivity along the axis of the electrode lessens the transfer of heat from the lower to the upper portion of an electrode when the lower portion is subjected to a high temperature, as by being immersed in a molten bath, and, to the extent that such conduction of heat is lessened, the rate of oxidation of the upper portion of the electrode is lowered. Furthermore, such heat as is generated in and conducted to the upper portion of the electrode is dissipated with greater rapidity by reason of the increased radial heat conductivity.

A further advantage of this invention, as compared to the prevailing extrusion process, is that electrodes may be manufactured much more economically because of the relatively inexpensive machinery that is required, and of the light inexpensive molds which may be used instead of expensive dies. Cheap weights, or equivalent pressure-applying instrumentalities, replace the very heavy and expensive presses, hydraulic accumulators, pumps and other apparatus used in the extrusion process. These advantages taken in connection with the increased uniformity of density effected by the practice of the invention, result in improved products manufactured by manifest economies.

By the use of a follower with a following up hold-down means in the molding of an electrode from a viscous bituminous mix, electrodes of high density can be obtained. When the downwardly moving mold comes to a sudden stop, the inertia of the mix in the mold causes the mix to continue its downward movement. The follower moves down with the mix. The hold-down means prevents back travel of the follower upon any rebound or expansion of the viscous mass, thus keeping it compacted and causing the liberation of entrapped gases. This results in securing a high density in the finished electrode, including the upper end portion. Because electrodes are subsequently shaped to screw together, it is important that a high density be procured at the ends of the electrode where this joint is formed.

Furthermore, as previously indicated, the invention is applicable to the molding of granular materials other than carbon when mixed with a bituminous binder.

According to the provisions of the patent statutes, I have explained the principle and mode of operation of my invention, and have given specific examples of how it may be practiced. However, I desire to have it understood that, within the scope of the appended claims, the invention is not limited to the specific examples given, nor to the size of articles or the forms in which they are molded.

I claim as my invention:

1. The method of molding into a coherent mass a normally unconsolidated mixture of granular material and a viscous bituminous binder, comprising placing the mixture in a mold, and jarring the mold.

2. The method of molding into a coherent mass a normally unconsolidated mixture of granular carbon and a viscous bituminous binder, comprising heating the mixture, placing the heated mixture in a mold, and jarring the mold.

3. The method of molding into a coherent mass a normally unconsolidated mixture of granular carbon and a viscous bituminous binder, comprising heating the mixture, placing the heated mixture in a heated mold, and jarring the mold.

4. The method of molding into a coherent mass a normally unconsolidated mixture of granular carbon and a viscous bituminous binder, comprising heating the mixture to a temperature of not less than about 100° C., placing the heated mixture in a heated mold, jarring the mold to consolidate the mixture, and cooling the mold body before removing the molded mass.

5. The method of making a carbon electrode comprising forming an unconsolidated mixture of from about 70 to 88% ground carbon and from about 12 to 30% of viscous bituminous binder, placing the mixture in a mold, and jarring the mold to consolidate the mixture.

6. The method of making a carbon electrode comprising forming an unconsolidated mixture of from about 70 to 88% ground carbon and from about 12 to 30% of a binder composed of tar and pitch, placing the mixture in a mold, and jarring the mold to consolidate the mixture.

7. The method of making a carbon electrode comprising forming a mixture of from about 70 to 88% ground calcined coke, and from about 12 to 30% of a binder composed of tar and pitch, heating the mixture, placing the heated mixture in a mold, and jarring the mold to consolidate the mixture.

8. The method of molding into a coherent mass a normally unconsolidated mixture of granular material and a viscous bituminous binder, comprising placing the mixture in a mold, confining and adding pressure to the upper surface of the mixture, and jarring the mold to consolidate the mixture.

9. The method of molding into a coherent mass a normally unconsolidated mixture of from about 70 to 88% ground carbon and from about 12 to 30% of a viscous bituminous binder, comprising heating the mixture, placing the heated mixture in a heated mold, confining and adding pressure to the upper surface of the mixture, and jarring the mold to consolidate the mixture.

10. A carbon electrode comprising a baked mixture of ground carbon and a bituminous binder, the electrode having greater lateral than longitudinal heat conductivity.

11. A carbon electrode comprising a baked mixture of ground carbon and a bituminous binder, the major portions of the particles of carbon having their largest cross sectional areas lying in planes transverse to the longitudinal axis of the electrode whereby the electrode has greater lateral than longitudinal heat conductivity.

12. A carbon electrode comprising a baked mixture of from about 70 to 88% ground carbon, and from about 12 to 30% of bituminous binder, the major portions of the particles of carbon having their largest cross sectional areas lying in planes transverse to the longitudinal axis of the electrode whereby the electrode has greater lateral than longitudinal heat conductivity.

13. The method of making carbon electrodes from a mixture of a bituminous binder and ground carbon, which comprises placing the mixture in a mold and jarring it under such conditions and for a length of time sufficient to effect an orientation of the majority of such carbon particles as have at least one dimension greater than another with their major axes in a direction generally at right angles to the jolting, whereby the electrode is more thermally conductive in a transverse direction than an axial direction.

14. The method of making a carbon electrode which is more thermally conductive in a direction transversely of the longitudinal axis thereof than in a coaxial direction, which comprises introducing a mix of granular carbon and a heat softened binder into a mold and jarring the mold for a sufficient time and while maintaining the mix under such conditions as to secure an orientation of the majority of such particles as have at least one dimension greater than another with their major axes approximately perpendicular to the major axis of the mold.

15. The method of making a carbon electrode which comprises forming a mixture of granular carbon and a bituminous binder, introducing it into a mold and jolting the mold while the mixture is being introduced.

16. The method of making a carbon electrode in a mold which comprises forming a mixture of granular carbonaceous material and a binder, jolting the mold while adding the mixture thereto, and thereafter compressing the mixture in the mold while continuing the jolting.

17. The method of making a carbon electrode which comprises heating a mixture of granular carbonaceous material and a bituminous binder, introducing the mix into a heated mold and subsequently compacting the heated mix in the heated mold by jolting the mold.

18. The method of forming electrodes which comprises placing a heated mixture of carbonaceous particles and a bituminous binder in a mold after the mold has been heated to a temperature higher than that of the mix, jolting the mold to compact the mix, and thereafter cooling the mix and then removing it from the mold.

19. The method of forming electrodes which comprises heating a mix of carbon particles and a bituminous binder to a temperature at which the mix possesses mobility and at which the carbon particles in the mix are free to adjust themselves in the mix, introducing the mix in this condition into a mold and jolting it in such manner as to cause orientation of the carbon particles with their largest cross-sectional area at approximately right angles to the direction of jolting.

20. The method of forming an electrode having a thermal conductivity which is greater in a lateral direction than an axial direction, which comprises forming a mix of granular carbon particles a portion of which have greater cross-sectional areas in one direction than in directions perpendicular thereto, mixing therewith a bituminous binder, the mobility of which increases upon heating, heating the mix and subsequently jolting the heated mix in a mold under such conditions and for a length of time such that the majority of the particles which have a greater cross-sectional area in one direction have their major axes at approximately right angles to the direction of jolting, the jolting being effected in the direction of the longitudinal axis of the mold.

21. The method of making a carbon electrode which comprises forming a granular mix of carbon particles and a binder, introducing the mix in a plastic state into a mold while the mold is being jolted in a vertical direction, thereafter applying pressure to the material at the top of the mold and continuing jolting the mold.

22. The method of making electrodes from a mix of carbon particles and a heat softened bituminous binder, which comprises heating the mix to a temperature at which the binder is softened, heating the walls of the mold to a temperature above the temperature of the mix, introducing the heated mix into the heated mold and jolting the mold, and thereafter circulating a cooling fluid around the mold to chill the mix, and then removing the mix from the mold.

23. The method of making elongated electrodes of high density, which comprises introducing a mixture of granular carbon and a viscous bituminous binder into a mold which is open at its upper end, jolting the mold in the direction of its longest axis by raising and dropping the mold and suddenly checking the downward movement thereof, maintaining a follower on the surface of the mix in the top of the mold which is free to move down in the mold with the compacting of the mix therein, and continuously holding the follower in intimate contact with the mix during a portion of the jolting operation and thereby preventing the rebound of the mix during this stage of the jolting.

24. The method of making an elongated electrode of high density, which comprises introducing a heated mixture of granular carbon and a bituminous binder into a vertical mold which is open at its upper end, jolting the mold vertically by raising it and dropping it and suddenly checking the downward movement thereof and continuously holding a follower against the surface of the material at the top of the mold and preventing the rebound of the follower during the operation of jolting to thereby compact the material and hold it against expansion during the operation of jolting to simultaneously secure a high density throughout the length of the electrode and procure an orientation of the major portion of such carbon particles as have at least one dimension greater than another with their greatest axes approximately perpendicular to the axis of the electrode.

25. The method of forming an electrode which comprises simultaneously jolting and compressing a mix of carbon particles and a binder in a mold while heating the upper and lower surfaces of the mix in the mold.

In testimony whereof I have hereunto set my hand.

VICTOR C. DOERSCHUK.